United States Patent [19]
Rees et al.

[11] Patent Number: 5,109,094
[45] Date of Patent: * Apr. 28, 1992

[54] PROCESS FOR THE PRODUCTION OF ORGANOSILICON COMPOUNDS

[75] Inventors: Sian B. Rees, Llantwit Fardre; Stephen Westall, Barry, both of United Kingdom

[73] Assignee: Dow Corning Limited, Barry, United Kingdom

[*] Notice: The portion of the term of this patent subsequent to Apr. 28, 2009 has been disclaimed.

[21] Appl. No.: 473,073

[22] Filed: Jan. 31, 1990

[30] Foreign Application Priority Data
Feb. 9, 1989 [GB] United Kingdom ............... 8902937

[51] Int. Cl.$^5$ ............................................. C08G 77/06
[52] U.S. Cl. ........................................ 528/14; 528/33
[58] Field of Search ............................... 528/14, 33

[56] References Cited

U.S. PATENT DOCUMENTS

| | | | |
|---|---|---|---|
| 3,094,497 | 6/1963 | Hyde | 260/18 |
| 3,160,601 | 12/1964 | Hyde | 260/46.5 |
| 4,888,405 | 12/1989 | Gamon et al. | 528/14 |
| 5,039,771 | 8/1991 | Morimoto et al. | 528/14 |

*Primary Examiner*—Melvyn I. Marquis
*Attorney, Agent, or Firm*—Sharon K. Severance

[57] ABSTRACT

A process for the production of an organosilicon condensation product which comprises contacting (A) at least one organosilicon compound having in the molecule at least one silicon-bonded hydroxyl group, the organic substituents being selected from monovalent hydrocarbon groups having from 1 to 14 carbon atoms and monovalent substituted hydrocarbon groups having from 1 to 10 carbon atoms in which the substituents are selected from amino, halogen, mercapto, hydroxyl, amido and ester, with (B) a hydroxide selected from the group consisting of magnesium, calcium, strontium and barium hydroxides.

9 Claims, No Drawings

PROCESS FOR THE PRODUCTION OF ORGANOSILICON COMPOUNDS

This invention relates to the production of organosiloxanes and relates in particular to a process for the condensation of organosiloxanes having silicon-bonded hydroxyl groups.

The production of organosiloxane polymers by the polymerisation or copolymerisation of relatively low molecular weight organosiloxanes is a well known step in the manufacture of commercial silicones. Generally the polymerisation or copolymerisation is carried out by contacting cyclic organosiloxanes or low molecular weight siloxanols, or mixtures thereof, with an acidic or a basic equilibration catalyst. Many substances which may be employed as such catalysts have been described in the literature and include sulphuric acid, hydrochloric acid, Lewis acids, sodium hydroxide, potassium hydroxide, tetramethylammonium hydroxide, tetrabutylphosphonium silanolate, amines and others. It is also known from U.S. Pat. No. 3,448,076 that cyanoalkyl-substituted organopolysiloxanes can be equilibrated readily with barium hydroxide even though this reagent is not reactive enough to equilibrate organopolysiloxanes not having cyanoalkyl substituents. However, although equilibration catalysts are effective in producing the desired increase in molecular weight of the starting materials, they cause scission and rearrangement of the siloxane bonds. As a result of such rearrangement the product often contains a significant proportion of low molecular weight siloxanes. For many applications, for example in the fabrication of silicone elastomers, it is necessary to remove such low molecular weight materials by devolatilisation in order to obtain a satisfactory product. Rearrangement of the siloxane bonds is also undesirable when the polymer is to contain a planned distribution of two or more types of organic substituents, for example in the production of a polydimethylsiloxane containing a proportion of organofunctional, e.g. aminoalkyl, substituents.

Catalysts for promoting the reactions $\equiv$SiOH + $\equiv$SiOH and $\equiv$SiOH + SiOR, R = organic, without siloxane bond cleavage have been disclosed in G.B. 895 091 and 918 823 and include for example tetramethylguanidine 2-ethylcaproate and n-hexylamine 2-ethylcaproate. However, many of such catalysts are liquids, or are not suitable for use at high temperatures, or are not readily removable from the product. There has, therefore, been a continuing search for substances which would be effective as catalysts for the production of condensation products of organosiloxanols but which would not cause molecular rearrangement and the consequent presence of significant amounts of low molecular weight species in the product. In particular the desired catalysts should preferably be suitable for use in heterogeneous systems and remain active during use, thereby enabling their recovery and re-use in batch processes or their application in a continuous process.

We have now found that hydroxides of certain metals have the ability to catalyse the condensation of organosilicon compounds. We have further found that said hydroxides can advantageously be employed in the production of organosilicon polymers having a relatively low content of low molecular weight species.

Accordingly, the present invention provides a process for the production of an organosilicon condensation product which comprises contacting (A) at least one organosilicon compound having in the molecule at least one silanol group and wherein the silicon-bonded organic substituents are selected from monovalent hydrocarbon groups having from 1 to 14 carbon atoms and monovalent substituted hydrocarbon groups having from 1 to 10 carbon atoms in which the substituents are selected from amino, halogen, mercapto, hydroxyl, amido and ester, with (B) a hydroxide selected from the group consisting of magnesium, calcium, strontium and barium hydroxides.

The process of this invention may be applied in the production of condensation products of any type of organosilicon compound having at least one silanol, that is $\equiv$SiOH, group in the molecule. Thus, the organosilicon compound may be an organosilane, organosiloxane or a silcarbane or mixtures of the same type or of different types of such organosilicon compounds. The silicon-bonded organic substituents in the organosilicon compound may be monovalent hydrocarbon groups having from 1 to 14 carbon atoms, for example alkyl, aryl, aralkyl, alkaryl or alkenyl groups or monovalent substituted hydrocarbon groups having from 1 to 10 carbon atoms for example amino-substituted alkyl and aryl groups, mercaptoalkyl groups, haloalkyl groups, esterified carboxyalkyl groups and hydroxyalkyl groups. Specific examples of the organic substituents which may be present in the organosilicon compounds employed in the process of this invention are methyl, ethyl, propyl, hexyl, dodecyl, tetradecyl, phenyl, xylyl, tolyl, phenylethyl, vinyl, allyl, hexenyl, —RNH$_2$, —RNHCH$_2$CH$_2$NH$_2$, —RSH, —RBr, —RCl and —ROH wherein R represents a divalent organic group, preferably having less than 8 carbon atoms for example alkylene e.g. —(CH$_2$)$_3$— and —CH$_2$CHCH$_3$CH$_2$—, arylene e.g. —C$_6$H$_4$— or aralkylene e.g. —(C$_6$H$_4$.CH$_3$)—. For the majority of commercial applications at least 50% of the organic substituents will be methyl, any remaining substituents being selected from vinyl and phenyl.

Although applicable to any type of organosilicon compound having at least one silanol group the process of this invention is particularly useful for the production of higher molecular weight organosiloxane polymers from lower molecular weight hydroxylated species. For example, during the production of organosiloxanes by the hydrolysis of the corresponding organochlorosilanes there is obtained a mixture of low molecular weight organosiloxanes having two or more silanol groups per molecule. The process of this invention may be employed to increase the molecular weight of such organosiloxanes while avoiding the production of undue amounts of volatile siloxanes. According to a preferred embodiment of this invention the organosilicon compounds (A) are silanol-terminated polydiorganosiloxanes, that is substantially linear organosiloxane polymers and oligomers having a hydroxyl group attached to each terminal silicon atom. Such polydiorganosiloxanes include those which can be represented by the average general formula

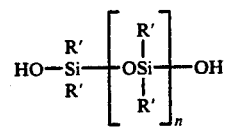

wherein each R' represents the hereinabove defined organic substituents and n is an integer, preferably from 1 to about 100. Commercially the R' substituents are normally predominantly methyl with any remaining R' substituents being selected from vinyl and phenyl. Said silanol-containing polydiorganosiloxanes are produced when diorganohalosilanes are hydrolysed during the commercial production of silicones. The resulting hydrolysis product is usually subjected to a separation procedure whereby the cyclic siloxanes, which are also formed, are removed by distillation.

If desired the condensation products may be end-stopped with triorganosiloxy units. One method of effecting such end-stopping comprises incorporating a triorganoalkoxy silane in the reaction mixture as hereinafter described. However, a more preferred method of producing end-stopped polydiorganosiloxanes employing the process of this invention comprises employing as organosilicon compound (A) both (i) a silanol-terminated polydiorganosiloxane and (ii) a polydiorganosiloxane terminated with a silanol group at one end and a triorganosiloxy group at the other.

The catalyst substance (B) is any hydroxide of magnesium, calcium, strontium or barium, the preferred substances being strontium hydroxide and barium hydroxide. The compounds may be employed in their anhydrous or hydrated forms. The particle size of the catalyst substance (B) is not critical. Generally, the smaller the particles the greater is the catalytic surface available. However, very fine particle size powders may be more difficult to remove from the condensation product.

The process of this invention involves contacting the organosilicon compound (A) with the catalyst (B) at a temperature at which the desired rate of molecular weight increase occurs. The temperatures employed may vary within wide limits for example from about 30° C. to about 200° C. Reaction at the lower temperatures is, however, normally too slow for commercial purposes and the process is preferably carried out at temperatures within the range from about 70° C. to 150° C. Preferably also, the removal of water formed during the condensation reaction is accelerated by carrying out the process under reduced pressure, that is, at a pressure less than normal atmospheric and most preferably less than about 0.5 bar.

One method of carrying out the process is by means of a batch procedure. For example, the catalyst may be dispersed in the organosilicon compound and the mixture raised to the required temperature. Alternatively, the organosilicon compound may be preheated prior to the addition of the catalyst. Advantageously the mixture is agitated during the reaction period to maintain the catalyst in suspension. Sufficient catalyst is employed to achieve the desired rate of condensation having regard to the nature and geometry of the processing equipment, temperature and other factors. From considerations of speed of reaction and economy of operation we prefer to employ from about 0.001 to about 5% by weight of the catalyst (B) based on the weight of the organosilicon compound. Termination of the condensation reaction, if desired, may be achieved by for example lowering the temperature of the mixture and/or by raising the reaction pressure to atmospheric and/or by separation or neutralisation of the catalyst. For most applications it is preferred to separate the catalyst from the condensation product on completion of the reaction, for example by filtration.

Because of their heterogeneous nature the catalysts (B) are particularly adapted for use in processes involving manufacture on a continuous, rather than a batch, basis. Properly employed such so-called 'continuous processes' avoid the delays and costs common to batch processing, for example those involved in the charging and discharging of the reaction vessel and separation of the catalyst material from the product. Thus, for example, the process of this invention may be advantageously employed for the continuous production of higher molecular weight siloxane polymers from lower molecular weight hydroxyl-containing species. When carrying out the process of this invention in a continuous mode contact between the catalyst material and the organosilicon compound may be achieved by passing the organosilicon compound over or through a bed of the catalyst material. When employing viscous reactants or products it may be necessary to adjust the porosity of the bed by granulation of the catalyst or other means. We have found that a particularly suitable form of bed for both continuous and batch operation can be obtained by depositing the catalyst substance in or on an inert particulate solid material, for example silica, having a particle size appropriate to the desired porosity of the bed.

The process of this invention is suitable for use in the preparation of a variety of organosilicon products by a condensation reaction. If desired there may be included with the organosilicon compound (A) other organosilicon compounds for example alkoxysilanes which are reactive with the silanol-containing reactant or condensation product to provide organofunctional or chain-terminating groups. Examples of such alkoxysilanes are $(CH_3)_3SiOCH_3$, $CH_3C_6H_5Si(OCH_3)_2$, $C_6H_5CH_3(CH_2=CH)SiOC_2H_5$, $H_2N(CH_2)_3Si(CH_3)_2)CH_3$ and $H_2NCH_2CH_2NH(CH_2)_3Si(CH_3)(OC_2H_5)_2$. Catalysts for the reaction $\equiv SiOH + \equiv SiOR$ may be added if desired to expedite the reaction between the alkoxysilane and the silanol-containing organosilicon product. We have, however, found that said reaction is catalysed by strontium hydroxide and barium hydroxide and the addition of other catalyst substances is unnecessary when such hydroxides are present in the reaction mixture.

The condensation products produced by the process of this invention may be employed in any of the variety of applications for the corresponding products made by prior art procedures. For example they find application in the treatment of textiles to render them water repellent and impart softness, as components of paper coating compositions to impart non-stick properties and in the production of adhesives and sealing materials.

The following Examples in which Me represents methyl illustrate the invention.

EXAMPLE 1

To 500 g of an $\alpha,\omega$-hydroxy polydimethylsiloxane having a number average molecular weight Mn by g.p.c of 3,300 was added with mixing 10 g of $Mg(OH)_2$. The mixture was agitated vigorously and heated to 100° C. for 2 hours under a pressure of 13 mbar. Condensation polymerisation of the polydimethylsiloxane occurred and the water formed was removed by distillation. The reaction mixture was then allowed to cool and the polymeric product examined by gel permeation chromatography.

The experiment was repeated employing respectively Ca(OH)$_2$, Sr(OH)$_2$8H$_2$O and Ba(OH$_2$)$_8$H$_2$O in place of the Mg(OH)$_2$ and in the same proportion (2% by weight).

The values of Mn obtained in each case were as follows.

| Catalyst | Mn of Product |
|---|---|
| None | 3,300 |
| Mg(OH)$_2$ | 4,257 |
| Ca(OH)$_2$ | 5,313 |
| Sr(OH)$_2$8H$_2$O | 31,416 |
| Ba(OH)$_2$8H$_2$O | 445,500 |

No detectable quantities of volatile siloxane materials were generated during the experiments.

EXAMPLE 2

Pellets of an amorphous silica were agitated ultrasonically in a saturated aqueous solution of Ba(OH)$_2$8H$_2$O for 18 hours. The aqueous liquor was then decanted and the pellets allowed to dry in an atmosphere free of CO$_2$.

The treated pellets (5 g) were added to 250 g of an α,ω-hydroxyl polydimethylsiloxane having a viscosity of 79 mPa.s at 25° C. and the mixture heated to 100° C. under 40 mbar pressure for 3 hours with constant agitation. After cooling to room temperature the catalyst was removed by filtration to leave a polydimethylsiloxane having a viscosity of 10 Pa.s at 25° C. and a silicon-bonded hydroxyl content of 786 ppm. No detectable quantity of volatile siloxane was produced during the reaction.

EXAMPLE 3

1,130 g of an α,ω-hydroxy polydimethylsiloxane (Mn=3000 by g.p.c analysis), 41.6 g of trimethylmethoxysilane and 5.8 g of Ba(OH)$_2$8H$_2$O were mixed together and the mixture heated to reflux at 60° C./atmospheric pressure for 4 hours. The pressure in the reaction vessel was then reduced to 6 mbar and the temperature raised to 140° C. These conditions were maintained for a further 5 hours during which time the viscosity of the reaction mixture reached a constant value. The reaction product was then cooled and filtered to yield a trimethylsilyl-terminated polydimethylsiloxane having a viscosity of 263 mPa.s at 25° C. and a total hydroxyl content of 142 ppm of which 51 ppm was attributable to silanol groups and the remainder to water. No detectable siloxane volatile materials were generated during the reaction.

EXAMPLE 4

0.25 g of strontium hydroxide octahydrate was added to 250 g of an α,ω silanol-terminated methylvinylsiloxane of average composition

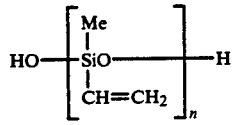

where n=8.25 and initial hydroxyl content of 23,968 ppm OH. The mixture was heated at 105° C. and 105 mbar pressure for 2 hours. After this time the hydroxyl content had decreased to 3980 ppm OH and the methylvinylsiloxane showed an increase in molecular weight equivalent to an average value of n of 51, as measured by gel permeation chromatograph (g.p.c.).

EXAMPLE 5

A mixture of siloxane oligomers comprising Me$_3$Si(OSiMe$_2$)$_n$OH and HO(SiMe$_2$O)$_n$H of viscosity 72×10$^{-6}$ m$^2$/s at 25° C. and containing 12,520 ppm silanol and 1% w/w of Me$_3$Si— was heated to 105° C. at 105 mbar pressure in the presence of 0.05% w/w barium hydroxide octahydrate. Over a period of four hours the silanol content of the mixture decreased to 70 ppm and the viscosity increased to 708×10$^{-6}$ m$^2$/s at 25° C. Gpc analysis of the polymer indicated that the product contained only 1.07% cyclosiloxanes and had the average composition Me$_3$Si(OSiMe$_2$)$_n$OSiMe$_3$ where n=185.

EXAMPLE 6

Cylindrical pellets of an amorphous aluminosilicate of typical size 10 mm L×5 mm D were coated with a surface layer of Ba(OH)$_2$.8H$_2$O. 25 g of the coated pellets were added to 1000 g of an α,ω silanol-terminated polydimethylsiloxane of average structure HO(SiMe$_2$O)$_n$H where n=35 to 40, viscosity 82 cS at 25° C. and volatile content measured at 135° C. of 1.5% w/w. The mixture was agitated to maintain the pellets in suspension and heated to 120° C. at a pressure of 15 mbar. After 20 minutes the viscosity of the polydimethylsiloxane had increased to 60,000 cS at 25° C. with a volatile content, measured at 135° C., of 3.43% w/w. The solid catalyst was separated by filtration, washed with a liquid dimethylsiloxane and re-used in an exact duplication of the first reaction. Results in the second reaction gave a viscosity of 65000 cS at 25° C. and a volatile content of 2.75% w/w.

That which is claimed is:

1. A process for the production of an organosilicon condensation product which comprises contacting at a temperature of 30° C. to 200° C.
   (A) at least one organosilicon compound having in the molecule at least one silanol group and wherein the organo substituents are selected from the group consisting of monovalent hydrocarbon groups having 1 to 14 carbon atoms and monovalent substituted hydrocarbon groups having 1 to 10 carbon atoms in which the substituents are selected from the group consisting of amino, halogen, mercapto, hydroxyl, amido and ester, with
   (B) a hydroxide selected from the group consisting of magnesium, calcium, strontium and barium hydroxides.

2. A process as claimed in claim 1 wherein the organosilicon compound (A) is passed over or through a bed containing (B).

3. A process as claimed in claim 1 wherein the hydroxide (B) is dispersed in the organosilicon compound (A) and is thereafter separated from the organosilicon condensation product.

4. A process as claimed in claim 3 wherein the hydroxide (B) is employed in an amount of from 0.001 to 5% by weight based on the weight of (A).

5. A process as claimed in claim 1 wherein (B) is present dispersed in or on a particulate solid which is inert under the reaction conditions.

6. A process as claimed in claim 1 wherein organosilicon compound (A) is a silanol-terminated polydiorganosiloxane.

7. A process as claimed in claim 1 wherein (A) and (B) are contacted at a temperature in the range from 70° C. to 150° C.

8. A process as claimed in claim 1 wherein the organosilicon compound (A) comprises both (i) a silanol-terminated polydiorganosiloxane and (ii) a polydiorganosiloxane terminated with a silanol group at one end and a triorganosiloxy group at the other.

9. A process as claimed in claim 1 wherein at least 50% of the total substituents in (A) are methyl and any remaining substituents are selected from the group consisting of phenyl and vinyl.

* * * * *